(12) United States Patent
Huang et al.

(10) Patent No.: US 10,162,414 B2
(45) Date of Patent: Dec. 25, 2018

(54) WIRELESS CONTROL DEVICE, POSITION CALIBRATOR AND ACCESSORY

(71) Applicant: HTC Corporation, Taoyuan (TW)

(72) Inventors: Ying-Chieh Huang, Taoyuan (TW);
Wen-Hsiung Shih, Taoyuan (TW);
Hsi-Yu Tseng, Taoyuan (TW);
Chih-Ting Chen, Taoyuan (TW);
Chun-Wei Chang, Taoyuan (TW);
Sung-Chi Tsai, Taoyuan (TW);
Yen-Cheng Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/394,813

(22) Filed: Dec. 30, 2016

(65) Prior Publication Data

US 2017/0255261 A1    Sep. 7, 2017

Related U.S. Application Data

(60) Provisional application No. 62/303,378, filed on Mar. 4, 2016, provisional application No. 62/303,390, filed on Mar. 4, 2016.

(51) Int. Cl.
*G06F 3/01* (2006.01)
*G06F 3/038* (2013.01)
(Continued)

(52) U.S. Cl.
CPC .............. *G06F 3/014* (2013.01); *G06F 1/163* (2013.01); *G06F 3/011* (2013.01); *G06F 3/015* (2013.01);
(Continued)

(58) Field of Classification Search
None
See application file for complete search history.

(56) References Cited

U.S. PATENT DOCUMENTS 5,913,727 A * 6/1999 Ahdoot ................... A63F 13/06
345/156
7,321,774 B1    1/2008 Lau et al.
(Continued)

FOREIGN PATENT DOCUMENTS

EP    2613223    7/2013

OTHER PUBLICATIONS

"Search Report of European Counterpart Application," dated Jul. 7, 2017, p. 1-4.
(Continued)

*Primary Examiner* — Leon-Viet Q Nguyen
(74) *Attorney, Agent, or Firm* — JCIPRNET

(57) ABSTRACT

A wireless control device adapted to detect a signal from a signal source for generating a corresponding first sensing signal and wirelessly transmit the first sensing signal to a host is provided. The wireless control device includes a position calibrator and an accessory. The position calibrator includes a first main body, a first coupling structure disposed on the first main body, at least one position sensing element adapted to detect the signal, a first microprocessor electrically connected to the position sensing element and a wireless transmitting module electrically connected to the first microprocessor and wirelessly transmitting the first sensing signal to the host. The accessory includes a second main body and a second coupling structure disposed on the second main body. A position calibrator and an accessory detachably assembled with the position calibrator to form a wireless control device are also provided.

24 Claims, 6 Drawing Sheets

(51) Int. Cl.
*G06F 1/16* (2006.01)
*G06F 3/0346* (2013.01)
*G06F 3/0354* (2013.01)

(52) U.S. Cl.
CPC ............ *G06F 3/038* (2013.01); *G06F 3/0346* (2013.01); *G06F 3/0354* (2013.01); *G06F 2203/0331* (2013.01)

(56) References Cited

U.S. PATENT DOCUMENTS

| | | | |
|---|---|---|---|
| 8,990,865 | B2 | 3/2015 | Igoe |
| 9,104,271 | B1 | 8/2015 | Adams et al. |
| 2005/0143173 | A1 | 6/2005 | Barney et al. |
| 2009/0212979 | A1 | 8/2009 | Catchings et al. |
| 2011/0202306 | A1* | 8/2011 | Eng .................. A61F 4/00 702/150 |
| 2012/0144554 | A1 | 6/2012 | Thellmann |
| 2013/0274904 | A1 | 10/2013 | Coza et al. |
| 2016/0054798 | A1 | 2/2016 | Messingher et al. |

OTHER PUBLICATIONS

"Office action of European Counterpart Application," dated Aug. 4, 2017, p. 1-8.
Manus VR Releases Teaser Footage of HTC Vive Experiments, retrieved from https://www.vrfocus.com/2015/12/manus-vr-releases-teaser-footage-of-htc-vive-experiments/.
"Office Action of Taiwan Counterpart Application," dated Nov. 14, 2017, p. 1-4.
Anonymous, "Image sensor-Wikipedia, the free encyclopedia," Apr. 26, 2018, Available at: http://web.archive.org/web/20160228140515/http://en.wikipedia.org/wiki/image_sensor/.
"Office Action of Europe Counterpart Application," dated May 14, 2018, p. 1-9.

\* cited by examiner

US 10,162,414 B2

WIRELESS CONTROL DEVICE, POSITION CALIBRATOR AND ACCESSORY

CROSS-REFERENCE TO RELATED APPLICATION

This application claims the priority benefits of U.S. provisional application Ser. No. 62/303,378, filed on Mar. 4, 2016 and U.S. provisional application Ser. No. 62/303,390, filed on Mar. 4, 2016. The entirety of each of the above-mentioned patent applications is hereby incorporated by reference herein and made a part of this specification.

BACKGROUND

Field of the Invention

The application is directed to a wireless control device, a position calibrator and an accessory.

Description of Related Art

With rapid evolution in electronic technologies and image processing techniques, virtual Reality (VR) constructed by computers has been widely applied in information broadcasting, entertainment and display. Recent VR products all emphasize human-computer interaction, and a user can perform the operation by using a head-mounted display and a control handle for the use of interactive training simulators, interactive toys or interactive television games. Among them, a screen of the VR is from the head-mounted display, while the control handle is used for operating objects in the VR. For example, the user operates a button or a touch panel on the handle to perform actions, such as grasping, tapping or dropping, in the VR.

However, the operation of grasping, tapping or dropping using the control handle does not conform to actual actions of a human body. In addition, the control handle in a single form can no longer satisfy demands for a variety of games and other application fields.

SUMMARY

The application provides a wireless control device, a position calibrator and an accessory capable of enhancing convenience and flexibility in operation.

A wireless control device of the application is adapted to detect a signal from a signal source to generate a corresponding first sensing signal and wirelessly transmit the first sensing signal to a host. The wireless control device includes a position calibrator and an accessory. The position calibrator includes a first main body, a first coupling structure, at least one position sensing element, a first microprocessor and a wireless transmitting module. The first coupling structure is disposed on the first main body. The at least one position sensing element is adapted to detect the signal from the signal source. The first microprocessor is electrically connected to the at least one position sensing element, wherein the first microprocessor generates the first sensing signal based on the signal detected by the at least one position sensing element. The wireless transmitting module is electrically connected to the first microprocessor and wirelessly transmits the first sensing signal to the host, wherein the first main body carries the at least one position sensing element, the first microprocessor and the wireless transmitting module. The accessory is detachably assembled with the position calibrator. The accessory includes a second main body and a second coupling structure. The second coupling structure is disposed on the second main body, wherein the position calibrator is detachably assembled to the second coupling structure of the accessory through the first coupling structure.

A position calibrator of the application is detachably assembled to a second coupling structure of a second main body of an accessory to form a wireless control device. The position calibrator includes a first main body, a first coupling structure, at least one position sensing element, a first microprocessor and a wireless transmitting module. The first coupling structure is disposed on the first main body. The at least one position sensing element is adapted to detect a signal from a signal source. The first microprocessor is electrically connected to the at least one position sensing element, wherein the first microprocessor generates a first sensing signal based on the signal detected by the at least one position sensing element. The wireless transmitting module is electrically connected to the first microprocessor and wirelessly transmits the first sensing signal to a host, wherein the first main body carries the at least one position sensing element, the first microprocessor and the wireless transmitting module.

An accessory of the application is detachably assembled with a position calibrator to form a wireless control device. The position calibrator includes a first main body, a first coupling structure disposed on the first main body, at least one position sensing element, a first microprocessor and a wireless transmitting module. The at least one position sensing element is adapted to detect a signal from a signal source. The first microprocessor electrically connected to is electrically connected to the at least one position sensing element and generates a first sensing signal based on the signal detected by the at least one position sensing element. The wireless transmitting module is electrically connected to the first microprocessor and wirelessly transmits the first sensing signal to a host. The accessory includes a second main body and a second coupling structure. The second coupling structure is disposed on the second main body. The position calibrator is detachably assembled to the second coupling structure of the accessory through the first coupling structure.

To sum up, the wireless control device provided by the application can facilitate the user to quickly involve in the virtual reality (VR), to enhance convenience and flexibility in operation. Moreover, the position calibrator of the application can be assembled with accessories in different forms, so as to form various types of wireless controllers to satisfy demands for a variety of games or other application fields.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
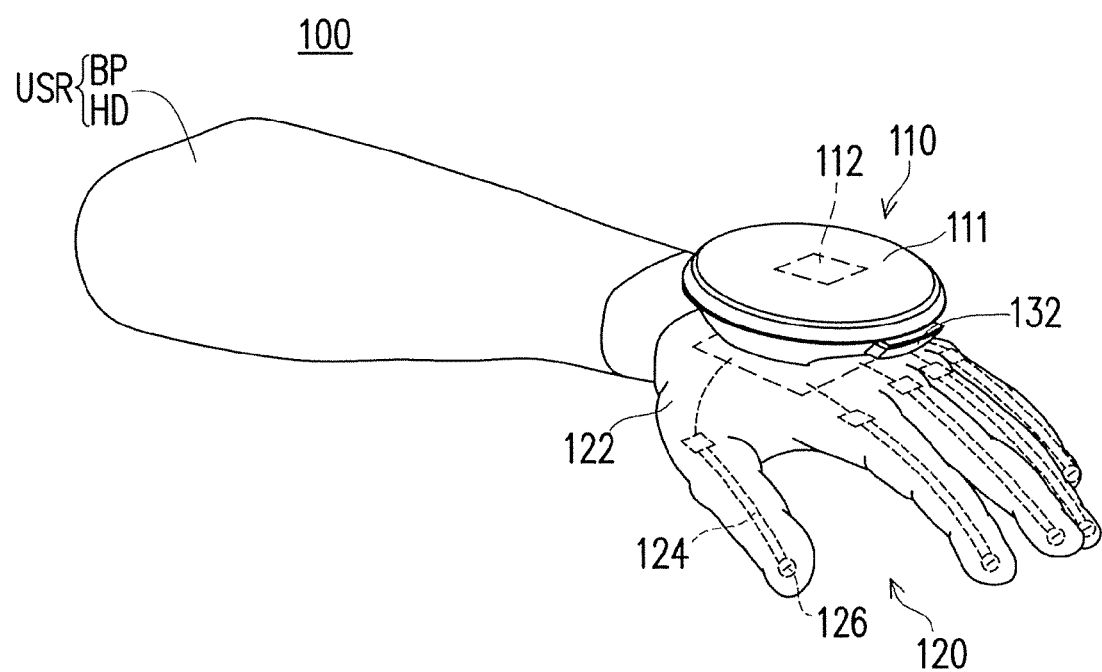
FIG. 1 is a schematic diagram illustrating a wireless control device according to a first embodiment of the invention.
Figure 2:
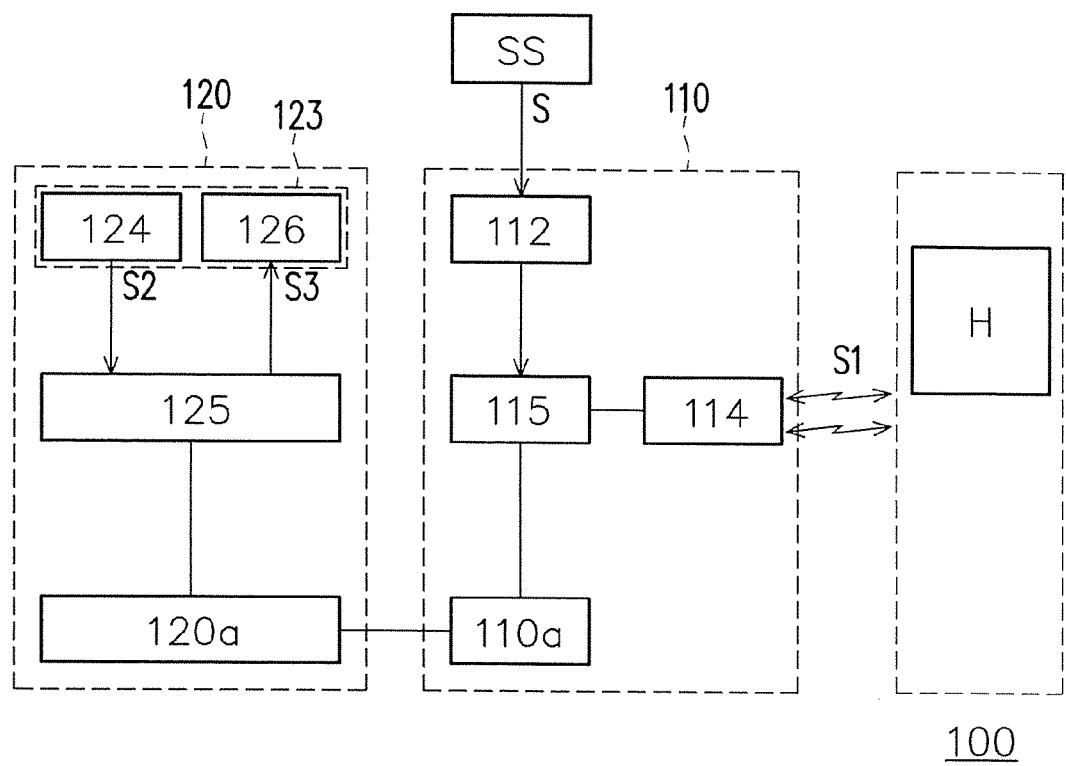
FIG. 2 is a schematic block diagram of the first embodiment of the invention.
Figure 3:
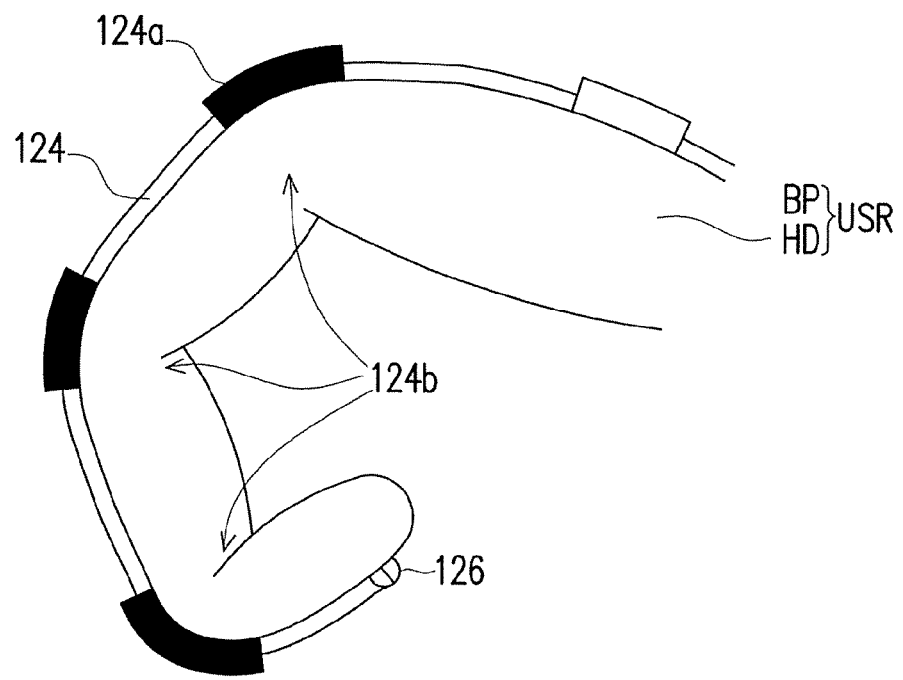
FIG. 3 is a schematic diagram illustrating the motion sensing module depicted in FIG. 1.

FIG. 1 is a schematic diagram illustrating a wireless control device according to a first embodiment of the invention. FIG. 2 is a schematic block diagram of the first embodiment of the invention. FIG. 3 is a schematic diagram illustrating the motion sensing module depicted in FIG. 1. Referring to FIG. 1, FIG. 2 and FIG. 3, in the present embodiment, a wireless control device 100 is adapted to detect a signal S from a signal source SS to generate a corresponding first sensing signal S1 and wirelessly transmit the first sensing signal S1 to a host H. The wireless control device 100 includes a position calibrator 110 and an accessory 120. The position calibrator 110 is detachably assembled with the accessory 120. The position calibrator 110 includes a first main body 111, at least one position sensing element 112, a first coupling structure 113, a wireless transmitting module 114 and a first microprocessor 115. The first main body 111 carries the position sensing element 112, the wireless transmitting module 114 and the first microprocessor 115. The first coupling structure 113 is disposed on the first main body 111. The position sensing element 112 is adapted to detect the signal S from the signal source SS. In the present embodiment, the position sensing element 112 is, for example, a light sensor, and the signal S from the signal source SS is, for example, a light signal. The light sensor may be, for example, an infrared light sensor or other invisible light signals. It is to be mentioned herein that FIG. 1 only exemplarily illustrates the position sensing element 112 as one. However, in other embodiments, the position calibrator 110 may also include a plurality of position sensing elements 112 distributed at different positions on the first main body 111, so as to achieve preferable sensing efficiency. In other embodiments, the position sensing element 112 may also be a Hall-effect sensor, and the signal S from the signal source SS may be, for example, an electromagnetic signal. In other embodiments, the position sensing element 112 may also be a microphone, and the signal S from the signal source SS may be, for example, an ultrasound wave. In other embodiments, the position sensing element 112 may also be a radio frequency (RF) detector, and the signal S from the signal source SS may be, for example, an RF signal.

In the present embodiment, the first microprocessor 115 is electrically connected to the position sensing element 112. The first microprocessor 115 generates the first sensing signal S1 based on the signal S detected by the position sensing element 112. Additionally, the wireless transmitting module 114 is electrically connected to the first microprocessor 115 and wirelessly transmits the first sensing signal S1 to the host H. For example, the wireless transmitting module 114 may be a Bluetooth, a WIFI, or any other radio frequency (RF) transmitting module. Additionally, the host H is an application device, such as a computer, a cell phone, a game host, etc. The host H also has a corresponding internal or external wireless transmitting module, and the wireless transmitting module may also be a Bluetooth, a WIFI, or any other RF transmitting module. In the present embodiment, the position sensing element 112 is, for example, a light sensor, and the signal S from the signal source SS is, for example, a light signal. Thereby, the host H may calculate a three-dimensional (3D) coordinate position of the position sensing element 112 in a space based on an angle and a frequency of the signal S transmitted from the signal source SS and the first sensing signal S1.

Figure 4:
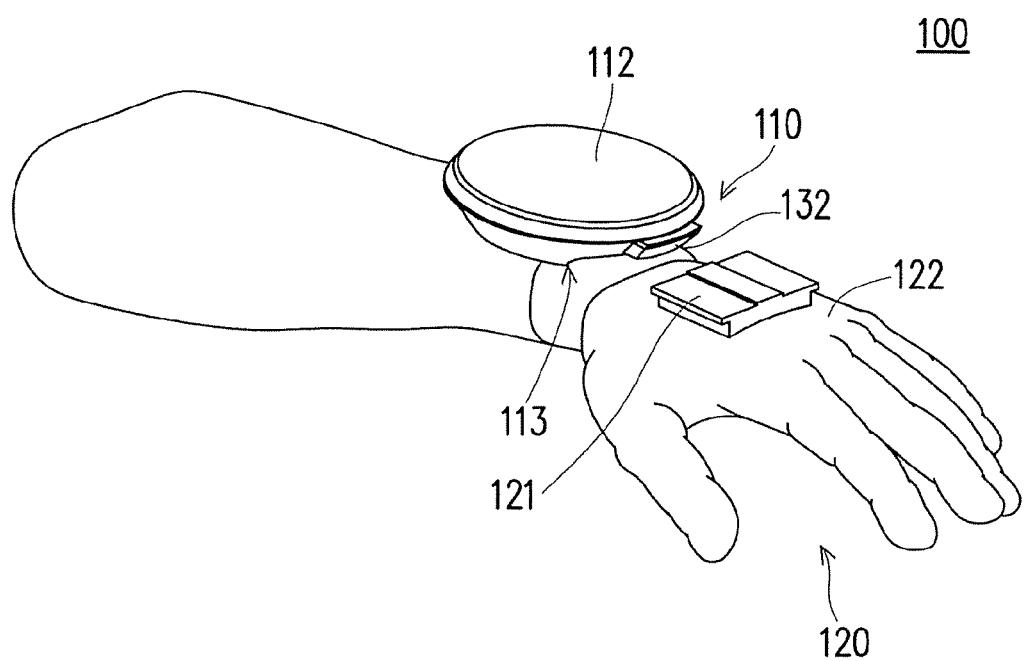
FIG. 4 is a schematic diagram illustrating the first coupling structure and the second coupling structure depicted in FIG. 1 in a separated state.

FIG. 4 is a schematic diagram illustrating the first coupling structure and the second coupling structure depicted in FIG. 1 in a separated state. Referring to FIG. 1 and FIG. 4, the same or similar elements are indicated by the same or similar reference labels and thus, will not be repeatedly described. In detail, in the present embodiment, the accessory 120 includes a second coupling structure 121 and a second main body 122. The second coupling structure 121 is disposed on the second main body 122. The position calibrator 110 is detachably assembled to the second coupling structure 121 of the accessory 120 through the first coupling structure 113. The second main body 122 may be a wearable part 128 or a handheld part. The wearable part 128 may be a glove, an elbow sleeve, a knee sleeve, a strap, an arm sleeve, a calf sleeve, a headgear, a shoe, a wristband or any other object suitable for being worn on a body portion BP of a user USR. In the present embodiment, the wearable part 128 of the second main body 122 is, for example, a glove. In addition, the handheld part may be a game gun, a bat, a tennis rackets, a badminton racket, a table tennis racket, a stick object or other objects capable of being held by the user.

In the present embodiment, the second coupling structure 121 is a slide rib, and the first coupling structure 113 is a slide groove, for example. To be specific, slide tracks protruding outward are provided at two sides of the slide rib, such that the slide groove may be coupled to the slide tracks to guide the position calibrator 110 to assemble to the second main body 122. In addition, the position calibrator 110 may also include an actuation button 132. The actuation button 132 is configured to release the coupling between the first coupling structure 113 and the second coupling structure 121. In another embodiment, the accessory 120 may also include an actuation button (not shown) configured to release the coupling between the first coupling structure 113 and the second coupling structure 121. However, in other embodiments, the first coupling structure 113 and the second coupling structure 121 may be, for example, a screw and a screw hole, a hook and a slot, or magnetic materials, or may be in other mechanical combination manners or other electrical combination manners. In addition, if the first coupling structure 113 and the second coupling structure 121 are the screw and the screw hole, the actuation button may not be required in the position calibrator 110 or the accessory 120.

Referring to FIG. 1, FIG. 2 and FIG. 3 again, the position calibrator 110 may include a first electrical port 110a. The accessory 120 may include an electronic module 123 and a second electrical port 120a operated with the first electrical port 110a. The electronic module 123 is electrically connected to the second electrical port 120a, and the first electrical port 110a is adapted to be electrically connected to the second electrical port 120a in a wireless or a wired manner. For example, the first electrical port 110a may be electrically connected with the second electrical port 120a through a USB interface, an IEEE1394 interface, a ThunderBolt interface, a PS/2 socket, a pogo pin connector or other wired manners. Alternatively, the first electrical port 110a may be electrically connected with the second electrical port 120a through the Bluetooth, the WIFI or other RF transmission manners.

In addition, the electronic module 123 may include a feedback module 126. The feedback module 126 is adapted to be electrically connected to the first microprocessor 115 through the second electrical port 120a and the first electrical port 110a. To be specific, the feedback module 126 may include at least one of a vibration element, a heating element, a light-emitting element and a sound-generating element. For example, the feedback module 126 may be a vibrator, a refrigerator, a heater, a fan, a current sensing coil, a light-emitting element, a speaker or the like.

In the present embodiment, the electronic module 123 may also include a motion sensing module 124 disposed on the wearable part 128 and configured to detect a motion of a movable portion 124b of the body portion BP to generate a corresponding second sensing signal S2. The second sensing signal S2 is transmitted to the first microprocessor 115 through the second electrical port 120a and the first electrical port 110a.

Furthermore, the motion sensing module 124 includes at least one bending sensor 124a corresponding to the movable portion 124b of the body portion BP to sense a bending amount of the movable portion 124b. Taking the glove illustrated in FIG. 3 for example, the movable portion 124b is, for example, a finger knuckle, and the bending sensor 124a is disposed at a position corresponding to the finger knuckle. The bending sensor 124a may be, for example, a stretching sensor or a curve sensor. When the user USR uses the wireless control device 100 to experience virtual reality (VR), the bending sensor 124a of the motion sensing module 124 may sense the motion of the movable portion 124b to generate the second sensing signal S2. In other words, the motion sensing module 124 uses the bending sensor 124a on the finger knuckle to track detailed actions of the knuckle and measure a deformation amount of the bent finger.

Specifically, in the present embodiment, the position sensing element 112 is, for example, a light sensor, and the signal S from the signal source SS is, for example, a light signal. After the position sensing element 112 detects the signal S transmitted from the signal source SS, the first microprocessor 115 generates the first sensing signal S1 based on position information of the position sensing element 112 and the signal S. Then, the first microprocessor 115 transmits the first sensing signal S1 to the wireless transmitting module 114. The wireless transmitting module 114, after receiving the first sensing signal S1, wirelessly transmits the first sensing signal S1 to the host H. Thereafter, the host H, after receiving the first sensing signal S1 and the second sensing signal S2 transmitted by the wireless transmitting module 114, analyzes and determines to obtain corresponding motion information and position information. The host H then generates a feedback signal S3 according to a determination result of the motion information and the position information. The host H transmits the feedback signal S3 to the feedback module 126 through the wireless transmitting module 114 and generates a corresponding actual somatosensory to the body portion BP.

For example, in the scenario that the user experiences the VR with the wireless control device 100, when a virtual object interacts with a virtual environment, the user may directly tap and control a character in the virtual environment, and a tapping touch behavior may be determined by the host H and then returned to the feedback signal S3 to generate a force feedback event. For example, a vibration takes place to stimulate a sense of force feedback, so as to generate an interaction effect between the computer system and the user in the VR.

In the present embodiment, the accessory 120 may also include a second microprocessor 125 to control operations of the motion sensing module 124 and the feedback module 126. The electronic module 123 and the second electrical port 120a are electrically connected to the second microprocessor 125, respectively. In detail, the motion sensing module 124 of the electronic module 123 transmits the second sensing signal S2 generated thereby to the second microprocessor 125, and the second microprocessor 125 then transmits the data to the first microprocessor 115. Thereby, an overall response time and operation efficiency of the wireless control device 100 may be improved through the operations of the first microprocessor 115 and the second microprocessor 125.

Figure 5:
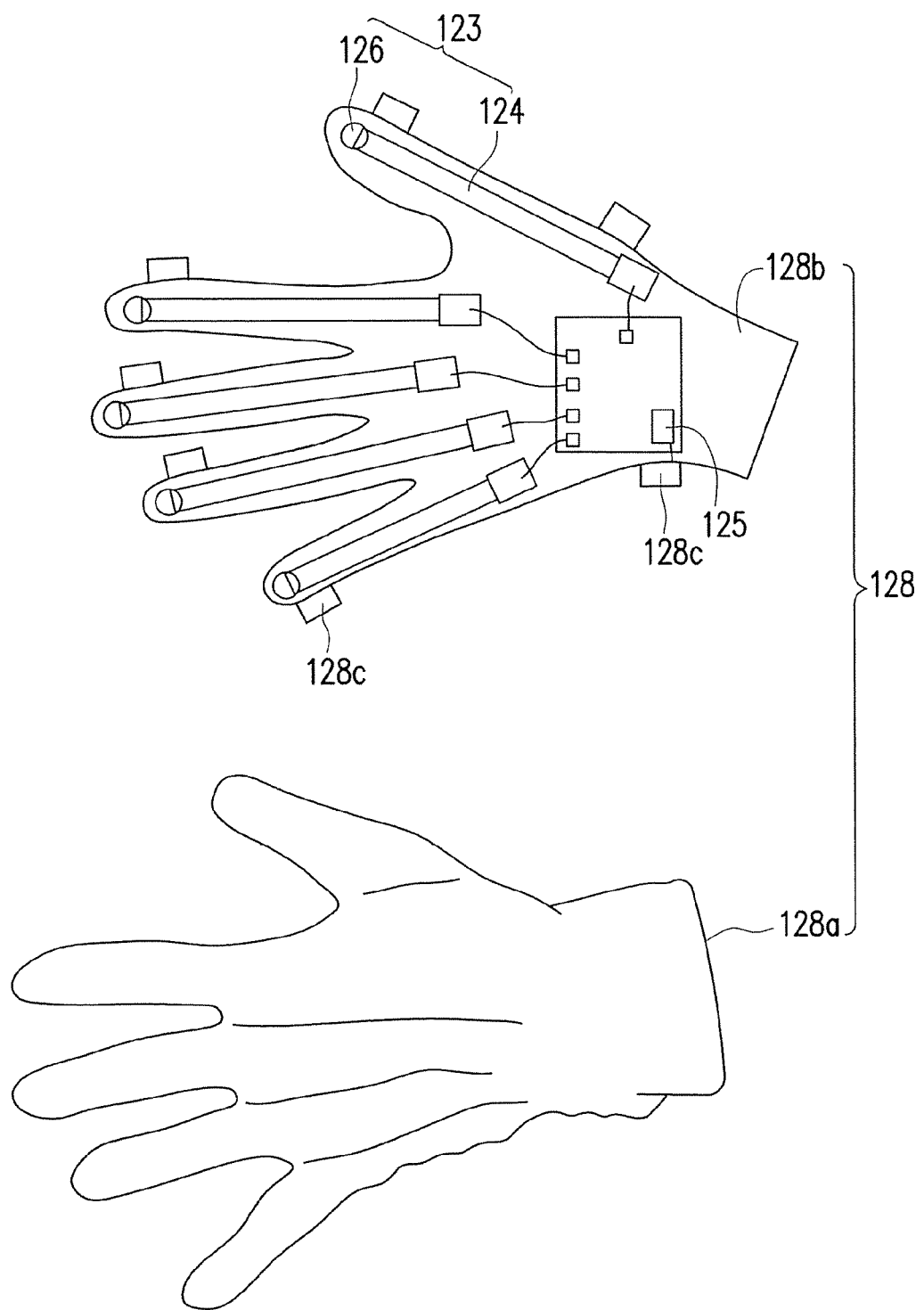
FIG. 5 is a schematic diagram illustrating a wireless control device according to a second embodiment of the invention.

FIG. 5 is a schematic diagram illustrating a wireless control device according to a second embodiment of the invention. Referring to FIG. 1, FIG. 2 and FIG. 5, the same or similar elements are indicated by the same or similar reference labels and thus, will not be repeatedly described. Generally speaking, a wearable device, in a normal use condition, usually absorbs user's sweat or other contaminants. In the case that the glove is taken an example of the wearable part 128, the wearable part 128 further includes an inner liner 128a and a cover layer 128b. The inner liner 128a is adapted to contact a hand HD of the user USR and is made of a material which is comfortable, absorbent and easy for cleaning, such as cotton or other materials which is capable of being washed or chemically cleaned. Further, the cover layer 128b is detachably disposed outside the inner liner 128a and carries the electronic module 123, the second electrical port 120a and other electronic elements.

In detail, the wearable part 128 may also include a fixing member 128c used to connect the cover layer 128b and the inner liner 128a. The fixing member 128c is, for example, a Velcro tape, a button or a strap, which is convenient for fixing the cover layer 128b to the inner liner 128a or detaching the cover layer 128b from the inner liner 128a. The inner liner 128a and the cover layer 128b are reusable as the inner liner 128a may be directly cleaned as long as being separated from the cover layer 128b, and then assembled to the cover layer 128b after being washed. It is to be mentioned herein that although the glove is taken as an example for describing the embodiments illustrated in FIG. 1 and FIG. 3 to FIG. 5, the wearable part 128 may also be an object capable of being worn on the body of the user USR, such as an elbow sleeve, a calf sleeve, a knee sleeve, a strap, an arm sleeve, a headgear, a shoe or a wristband.

Figure 6:
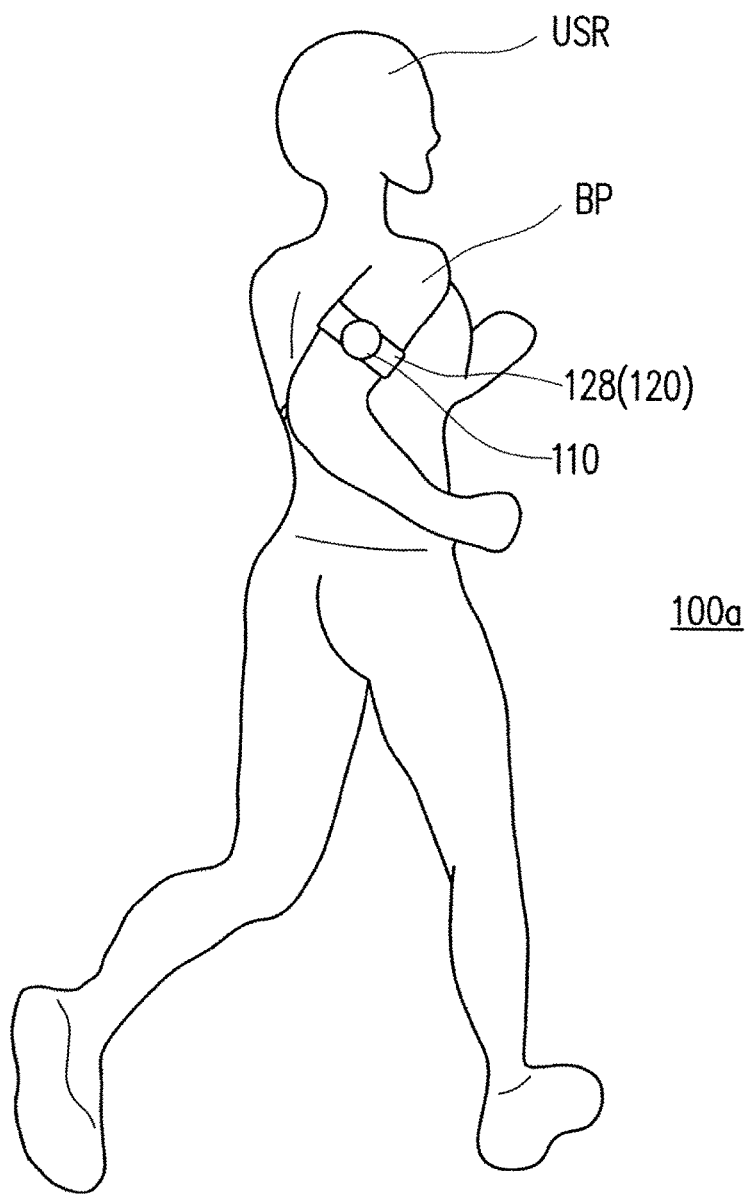
FIG. 6 is a schematic diagram illustrating a wireless control device according to a third embodiment of the invention.

FIG. 6 is a schematic diagram illustrating a wireless control device according to a third embodiment of the invention. Referring to FIG. 6, the wearable part 128 of the wireless control device 100a of the present embodiment may be a strap or an arm sleeve, where the wearable part 128 is adapted to be worn on an arm of the user USR. In the present embodiment, the accessory 120 may also not be provided with the second electrical port, the electronic module and the second microprocessor. The position calibrator 110 and the accessory 120 may also be assembled to each other through a first coupling structure (not shown) and a second coupling structure (not shown). The first coupling structure (not shown) or the second coupling structure (not shown) may be a Velcro tape, a button, a strap or a buckle. If the accessory 120, e.g., a strap or an arm sleeve, has claw hooks or other mechanical structures capable of directly fastening the position calibrator 110, the position calibrator 110 may also not be provided with the second coupling structure.

Figure 7:
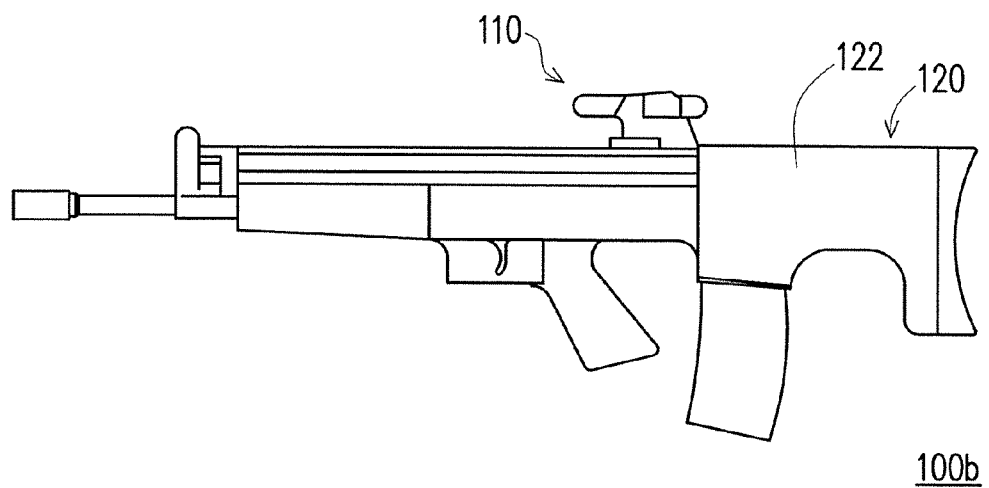
FIG. 7 is a schematic diagram illustrating a wireless control device according to a fourth embodiment of the invention.
Figure 8:
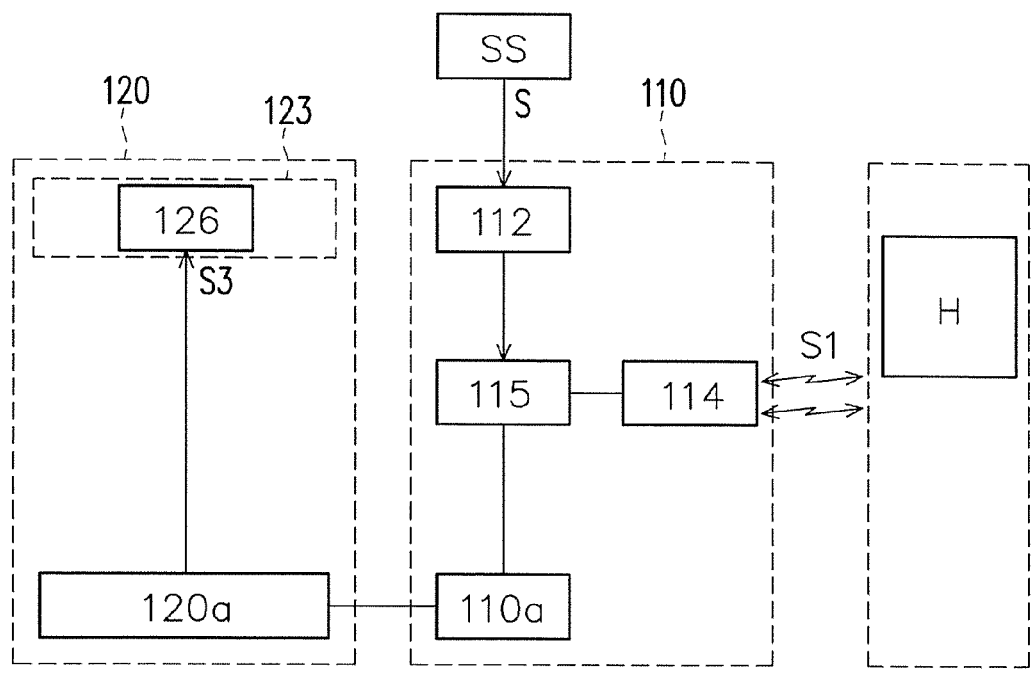
FIG. 8 is a schematic block diagram of the fourth embodiment of the invention.

FIG. 7 is a schematic diagram illustrating a wireless control device according to a fourth embodiment of the invention. FIG. 8 is a schematic block diagram of the fourth embodiment of the invention. Referring to both FIG. 7 and FIG. 8, in the present embodiment, the second main body 122 of the accessory 120 may also be a handheld part, such as a game gun body. The position calibrator 110 is assembled onto the second main body 122 to form a wireless control device 100b. The game gun may be accurately spatially positioned with the position calibrator 110, such that the VR and the environment of the real world may be closely combined to enhance the VR experiencing quality for the user.

For example, the electronic module 123 of the accessory 120 of the present embodiment may include the feedback module 126. The feedback module 126 is adapted to be electrically connected to the first microprocessor 115 through the second electrical port 120a and the first electrical port 110a. Specifically, the feedback module 126 includes at least one of a vibration element, a heating element, a light-emitting element and a sound-generating element. For example, the feedback module 126 may be a vibrator, a refrigerator, a heater, a fan, a current sensing coil, a light-emitting element, a speaker or the like. In other embodiments, the handheld part may also be a bat, a tennis rackets, a badminton racket, a table tennis racket, a stick object or other handheld objects.

In the present embodiment, the feedback module 126 is a vibrator. When the user experiences the VR while operating the wireless control device 100b, the feedback module 126 may provide a vibration feedback, so as to provide the user with more plentiful and diverse sensual amusements. Additionally, in the present embodiment, the electronic module 123 may be electrically connected to the first microprocessor 115 through the second electrical port 120a and the first electrical port 110a, without being operated with the second microprocessor 125.

Based on the above, the wireless control device provided by the application generates the corresponding first sensing signal by detecting the signal transmitted from the signal source and wirelessly transmits the first sensing signal to the host, so as to achieve accurately spatially positioning the wireless control device. In addition, the position calibrator provided by the application can be assembled with accessories in different forms, such as a wearable part like a glove, an elbow sleeve, a knee sleeve, a strap, an arm sleeve, a headgear, a shoe or a wristband or a handheld part like a game gun, a bat, a tennis rackets, a badminton racket, a table tennis racket, a stick object or the like, so as to form the wireless controller in various forms to satisfy demands for a variety of games or other application fields. Moreover, in term of the accessory of a glove form, the accessory of the glove form includes an inner liner and a cover layer, where the cover layer is detachably disposed outside the inner liner, and the cover layer includes various circuit elements. Thus, the inner liner can be detached for cleaning, without causing damages to the circuit elements inside the cover layer.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A wireless control device, adapted to detect a signal from a signal source to generate a corresponding first sensing signal and wirelessly transmit the first sensing signal to a host, the wireless control device comprising:
   a position calibrator, comprising:
      a first main body;
      a first coupling structure, disposed on the first main body;
      at least one position sensing element, adapted to detect the signal from the signal source, the at least one position sensing element comprising a plurality of light sensors fixed to the first main body with fixed relative position;
      a first microprocessor, electrically connected to the at least one position sensing element, wherein the first microprocessor generates the first sensing signal based on the signal detected by the at least one position sensing element; and
      a wireless transmitting module, electrically connected to the first microprocessor and wirelessly transmitting first sensing signal to the host, wherein a three-dimensional coordinate position of the at least one position sensing element in a space is calculated based on a frequency of the signal transmitted from the signal source and the first sensing signal, wherein the first main body carries the at least one position sensing element, the first microprocessor and the wireless transmitting module;
   an accessory, detachably assembled with the position calibrator and comprising:
      a second main body; and
      a second coupling structure, disposed on the second main body, wherein the position calibrator is detachably assembled to the second coupling structure of the accessory through the first coupling structure.

2. The wireless control device according to claim 1, wherein the position calibrator or the accessory further comprises an actuation button coupled to the first coupling structure and/or the second coupling structure and configured to release the binding between the position calibrator and the accessory.

3. The wireless control device according to claim 1, wherein the second main body further comprises a wearable part or a handheld part, the wearable part is adapted to be worn on a body portion of a user, and the wearable part comprises a strap, an arm sleeve, a headgear, a shoe or a wristband.

4. The wireless control device according to claim 1, wherein the position calibrator further comprises a first electrical port, the accessory further comprises an electronic module and a second electrical port operated with the first electrical port, the electronic module is electrically connected to the second electrical port, and the first electrical port is adapted to be electrically connected to the second electrical port in a wireless or a wired manner.

5. The wireless control device according to claim 4, wherein the accessory further comprises a second microprocessor, and the electronic module and the second electrical port are electrically connected to second microprocessor, respectively.

6. The wireless control device according to claim 4, wherein the electronic module comprises a feedback module adapted to be electrically connected to the first microprocessor through the second electrical port and the first electrical port.

7. The wireless control device according to claim 6, wherein the feedback module comprises at least one of a vibration element, a heating element, a light-emitting element and a sound-generating element.

8. The wireless control device according to claim 4, wherein the second main body further comprises a wearable part adapted to be worn on a body portion of a user, and the electronic module comprises a motion sensing module disposed on the wearable part and configured to detect a motion of a movable portion of the body portion to generate a corresponding second sensing signal, and the second sensing signal is transmitted to the first microprocessor through the second electrical port and the first electrical port.

9. The wireless control device according to claim 8, wherein the motion sensing module comprises at least one bending sensor corresponding to the movable portion of the body portion to sense a bending amount of the movable portion, and the wearable part comprises a glove, an elbow sleeve or a knee sleeve.

10. The wireless control device according to claim 9, wherein the glove comprises:
    an inner liner, adapted to contact a hand of the user; and
    a cover layer, detachably disposed outside the inner liner and carrying the electronic module and the second electrical port.

11. The wireless control device according to claim 1, wherein the light sensors are infrared light sensors.

12. A position calibrator, detachably assembled to a second coupling structure of a second main body of an accessory to form a wireless control device, comprising:
    a first main body;
    a first coupling structure, disposed on a first main body;
    at least one position sensing element, adapted to detect a signal from a signal source, the at least one position sensing element comprising a plurality of light sensors fixed to the first main body with fixed relative position;
    a first microprocessor, electrically connected to the at least one position sensing element, wherein the first microprocessor generates a first sensing signal based on the signal detected by the at least one position sensing element; and
    a wireless transmitting module, electrically connected to the first microprocessor and wirelessly transmitting the first sensing signal to a host, wherein a three-dimensional coordinate postition of the at least one position sensing element in a space is calculated based on a frequency of the signal transmitted from the signal source and the first sensing signal, wherein the first main body carries the at least one position sensing element, the first microprocessor and the wireless transmitting module.

13. The position calibrator according to claim 12, wherein the position calibrator or the accessory further comprises an actuation button coupled to the first coupling structure and/or the second coupling structure and configured to release the biding between the position calibrator and the accessory.

14. The position calibrator according to claim 12, wherein the position calibrator further comprises a first electrical port, the accessory further comprises an electronic module and a second electrical port operated with the first electrical port, the electronic module is electrically connected to the second electrical port, and the first electrical port is adapted to be electrically connected to second electrical port in a wireless or a wired manner.

15. An accessory, detachably assembled with a position calibrator to form a wireless control device, wherein the position calibrator comprises a first main body, a first coupling structure disposed on the first main body, at least one position sensing element, a first microprocessor and a wireless transmitting module, wherein the at least one position sensing element is adapted to detect a signal from a signal source and comprises a plurality of light sensors fixed to the first main body with fixed relative position, the first microprocessor is electrically connected to the at least one position sensing element and generates a first sensing signal based on the signal detected by the at least one position sensing element, and the wireless transmitting module is electrically connected to the first microprocessor and wirelessly transmits the first sensing signal to a host, wherein a three-dimensional coordinate position of the at least one position sensing element in a space is calculated based on a frequency of the signal transmitted from the signal source and the first sensing signal, the accessory comprising:
    a second main body; and
    a second coupling structure, disposed on the second main body, wherein the position calibrator is detachably assembled to the second coupling structure of the accessory through the first coupling structure.

16. The accessory according to claim 15, wherein the position calibrator or the accessory further comprises an actuation button coupled to the first coupling structure and/or the second coupling structure and configured to release the binding between the position calibrator and the accessory.

17. The accessory according to claim 15, wherein the second main body further comprises a wearable part or a handheld part, the wearable part is adapted to be worn on a body portion of a user, and the wearable part comprises a strap, an arm sleeve, a headgear, a shoe or a wristband.

18. The accessory according to claim 15, wherein the position calibrator further comprises a first electrical port, the accessory further comprises an electronic module and a second electrical port operated with the first electrical port, the electronic module is electrically connected to the second electrical port, and the first electrical port is adapted to be electrically connected to the second electrical port in a wireless or a wired manner.

19. The accessory according to claim 18, further comprising a second microprocessor, and the electronic module and the second electrical port being electrically connected to the second microprocessor, respectively.

20. The accessory according to claim 18, wherein the electronic module comprises a feedback module adapted to be electrically connected to the first microprocessor through the second electrical port and the first electrical port.

21. The accessory according to claim 20, wherein the feedback module comprises at least one of a vibration element, a heating element, a light-emitting element and a sound-generating element.

22. The accessory according to claim 18, wherein the second main body further comprises a wearable part adapted to be worn on a body portion of a user, and the electronic module comprises a motion sensing module disposed on the wearable part and configured to detect a motion of a movable portion of the body portion to generate a corresponding second sensing signal, and the second sensing signal is transmitted to the first microprocessor through the second electrical port and the first electrical port.

23. The accessory according to claim 22, wherein the motion sensing module comprises at least one bending sensor corresponding to the movable portion of the body portion to sense a bending amount of the movable portion, and the wearable part comprises a glove, an elbow sleeve or a knee sleeve.

24. The accessory according to claim 23, wherein the glove comprises:
- an inner liner, adapted to contact a hand of the user; and
- a cover layer, detachably disposed outside the inner liner and carrying the electronic module and the second electrical port.

\* \* \* \* \*